United States Patent [19]

Krofchalk et al.

[11] Patent Number: 4,945,759

[45] Date of Patent: Aug. 7, 1990

[54] VEHICLE PERFORMANCE MONITORING SYSTEM

[75] Inventors: Gary F. Krofchalk, 208 Dartbrook, Rockwall, Tex. 75087; Richard F. Dickey, Irving; Courtney Hall, Dallas, both of Tex.

[73] Assignee: Gary F. Krofchalk, Rockwall, Tex.

[21] Appl. No.: 316,507

[22] Filed: Feb. 27, 1989

[51] Int. Cl.[5] .......... G01M 15/00

[52] U.S. Cl. .......... 73/117.3; 340/439

[58] Field of Search .......... 73/115, 117.3; 346/3, 346/4, 33 D, 33 TP; 364/424.04; 340/439, 451

[56] References Cited

U.S. PATENT DOCUMENTS

| | | | |
|---|---|---|---|
| 3,281,783 | 10/1966 | Adams | 340/439 |
| 3,318,151 | 5/1967 | Behrendt et al. | 346/3 X |
| 3,812,710 | 5/1974 | Bauman et al. | 73/114 |
| 3,922,909 | 12/1975 | Dixson et al. | 73/115 |
| 3,942,364 | 3/1976 | Bunker | 73/115 |
| 3,977,238 | 8/1976 | Byington, Jr. | 73/114 |
| 4,067,061 | 1/1978 | Juhasz | 364/900 |
| 4,067,232 | 1/1978 | Murray | 73/115 |
| 4,072,850 | 2/1978 | McGlynn | 364/424 |
| 4,093,939 | 6/1978 | Mitchell | 340/439 |
| 4,188,618 | 2/1980 | Weisbart | 340/201 R |
| 4,236,215 | 11/1980 | Callahan et al. | 364/436 |
| 4,258,421 | 3/1981 | Juhasz et al. | 364/424 |
| 4,280,358 | 7/1981 | Henderson | 73/115 |
| 4,307,455 | 12/1981 | Juhasz et al. | 364/900 |
| 4,831,539 | 5/1989 | Hagenbuch | 364/424.04 X |

OTHER PUBLICATIONS

Rockwell International, *Tripmaster* Brochure, 1986.

Cadec Systems Inc., *Modular Series* Brochure, 8/88.

Anchron UK Ltd., *The Data-Com II Electronic Truck Management System* Brochure, undated.

*Primary Examiner*—Jerry W. Myracle

*Attorney, Agent, or Firm*—Johnson & Gibbs

[57] ABSTRACT

Apparatus for monitoring the operating performance of a vehicle. The vehicle speed, engine operating speed and manifold pressure of the vehicle are compared to corresponding preset threshold values. The total time during which each of the vehicle speed, engine operating speed and manifold pressure exceed its threshold value is recorded and provided to the driver in a real-time display. The total time during which the engine is operating and the total time during which the engine is idling are also recorded and provided to the driver in a real time display.

21 Claims, 4 Drawing Sheets

VEHICLE PERFORMANCE MONITORING SYSTEM

BACKGROUND OF THE INVENTION

This invention relates to a system for monitoring the performance of a vehicle during operation and, more particularly, to a system which monitors the performance of a vehicle during operation by measuring the total time during which the vehicle is operated under conditions which cause the vehicle operation parameters to exceed preselected threshold values. This invention further relates to a system for monitoring the performance of a vehicle capable of providing real time information related to the operation of the vehicle under conditions exceeding vehicle operation threshold values.

It is well know that the manner in which a vehicle is operated on the road by its driver is largely responsible for both the degree of wear and tear on the vehicle as well as the economic efficiency of the vehicle operation. This is the principal reason instrument gauges such as the speedometer, tachometer and others are included for providing a real time visual display containing information related to the efficiency of the vehicle operation. For example, the speedometer and tachometer typically include a visual display indicative of the vehicle speed and engine operating speed. The driver, cognizant of the fact that continued high vehicle speed or high engine operating speed could result in unnecessarily inefficient vehicle operation, would then reduce vehicle speed or engine operating speed to improve vehicle efficiency. Efficient vehicle operation is particularly desirable in large scale, multiple vehicle operations such as trucking lines where the maximization of efficient vehicle operation would result in significant savings.

A traditional problem for multiple vehicle operations achieving improved vehicle operating efficiency is that some vehicle operators tend to disregard recommendations which would achieve improved vehicle efficiency. A need has arisen, therefore, for a method of determining how efficiently a driver is operating the vehicle.

One of the earliest vehicle monitoring systems developed involved the use of a "tach chart." During the operation of a vehicle, the output Of the tachometer would be recorded on a chart as a function of time. The chart produced could then be utilized to evaluate how efficiently the driver had operated the vehicle over a period of time. Periods of inactivity, idling, or over-revving of the engine could be readily determined upon analysis of the chart. Such devices were, however, unable to record tachometer output over long periods of time due to physical limitations on the size or length of the recording medium. Thus, monitoring devices were of little use in vehicle operations where a single vehicle would be on the road for weeks at a time. Furthermore, tach chart devices were unable to distinguish between drivers when multiple drivers operated the same vehicle being monitored on a single trip. Common driver practices, for example, the practice of "slip seating" where two drivers assigned to a single vehicle will exchange seats during the trip, would reduce the usefulness of the collected data. While analysis of the data would provide information on the efficiency of the vehicle operation, slip seating and other driver practices would make the recorded data useless in evaluating the performance of specific drivers.

In recent years, the use of computers and other processing devices in vehicle performance monitoring systems have become popular. Typically, computer-based vehicle performance monitoring systems include multiple sensors for determining a number of vehicle operating characteristics indicative of the efficiency of the operation of the vehicle. The data would be stored in an on-board memory system and, at the completion of the trip, the on-board memory system would be plugged into a host computer. The stored data would be dumped into the host computer for subsequent analysis of the efficiency with which the driver had operated the vehicle. Unfortunately, such computer-based monitoring systems can easily cost two to three thousand dollars per vehicle. To outfit an entire fleet of vehicles, therefore, would represent a substantial investment, often in excess of what the industry is willing to pay.

Furthermore, the computer-based monitor system was not particularly useful in assisting drivers to improve the efficiency of their driving. Typically, performance reports were not available for review by the driver until long after the trip had been completed and when the driver's memory was sketchy. Computer-based vehicle performance monitoring systems also generally fail to provide immediate feedback to the driver of how efficiently the vehicle is being operated each moment. This failure to provide sufficient guidance to the driver on how to optimize the performance of the vehicle renders the system unable to train the driver how to operate a vehicle to maximize driving efficiency.

Since computer-based monitoring systems tended only to produce information useful only to supervisors in evaluating a driver's performance, they became very unpopular with drivers. Such systems were seen as "tattletales", useful only in reporting driving errors to the drivers, supervisors. To retaliate, some drivers would even disable or damage the monitoring systems while others would modify the monitoring systems to falsify the results.

Numerous vehicle monitoring systems which detect and record information related to vehicle operation for later analysis are known. In general, however, a driver interacts with such monitoring systems only to provide additional data for recording. The collected data would neither be available to nor analyzed for the driver. For example, U.S. Pat. No. 4,067,061 to Juhasz discloses a vehicle monitoring and recording system which records the mileage travelled, the fuel consumed and the elapsed time on a tape cassette. At the end of a trip, the recorded information is transferred to a computer for display of information related to the mileage and fuel consumption of the vehicle. Similarly, U.S. Pat. No. 4,072,850 to McGlynn discloses a system for monitoring the usage of a vehicle. In McGlynn, data useful in determining the usage of the vehicle would be automatically collected and recorded on magnetic tape. Later, the recorded data would be transferred to an external computer system for processing U.S. Pat. No. 4,188,618 to Weisbart discloses a vehicle monitoring system which detects numerous vehicle performance characteristics including vehicle speed, elapsed trip distance, engine rpm, total engine revolutions, total fuel consumption, rate of fuel consumption and the like as a function of time. There data are stored in an on-board memory for later transfer to a fixed base computer for processing of the collected vehicle performance information.

Numerous vehicle monitoring systems which provide information related to the operating characteristics of the vehicle to the driver are also known. One such system may be seen in U.S. Pat. No. 4,093,939 to Mitchell. Mitchell discloses a vehicle monitoring system having sensors for determining if the vehicle speed engine operating speed and/or the acceleration exceed corresponding threshold values. An alarm is activated to alert the driver when a threshold value has been or is about to be exceeded, thereby resulting in the operation of the vehicle under "abusive" conditions. The amount of time that the vehicle is operated under one or more "abusive" conditions is also recorded. Mitchell additionally provides for recording the total time during which the vehicle is in motion as well as the total time during which the engine is in operation.

However, the particular operating characteristic information which has been supplied to the driver by prior art vehicle monitoring systems does not provide the information which is most useful in determining whether the vehicle is being operated improperly. For example, while the total time during which the vehicle operates at excess speeds provides information regarding the driver's compliance with speed regulations, an excess speed recorder also can mislead a truck company manager as to whether the vehicle has been operated under excessive conditions. Downhill stretches of road tend to promote excess speed conditions even while the vehicle is otherwise being operated normally. Uphill stretches of road, on the other hand, tend to promote excessive engine operating conditions despite vehicle speeds well within the desired operating range. For the same reason, the total time at which the vehicle accelerates at an excessive rate may be misleading as to whether the vehicle has been operated properly. The total time during which the engine has operated at an excessive engine speed, on the other hand, is not the most direct method of measuring engine operation and may not always be the best indicator of improper driving habits such as a habit of excessively accelerating the vehicle.

While devices which measure the manifold pressure of a vehicle engine are known, there have been only limited applications of data related to manifold pressure being collected and provided to the driver as an indicator of the improper operation of the vehicle. Prior uses of information related to the manifold pressure have been directed primarily towards the collection of non-cumulative information, and more particularly non-cumulative fuel consumption information. U.S. Pat. No. 3,812,710 issued to Bauman discloses a device which uses manifold pressure and other engine parameters to produce an electrical output indicative of fuel consumption, distance travelled and time travelled. The output of the Bauman device is a variable output which drives a meter to display increases or decreases in fuel mileage. U.S. Pat. No. 4,067,232 to Murray discloses a system which monitors pressure and vacuum to mechanically operate a switch which shows changes in the rate of fuel consumption utilizing a set of colored lights.

Finally, prior vehicle performance monitoring systems have never been configured to permit the driver to readily determine the detailed information most closely related to the operating efficiency of the vehicle during a trip so that much information can be readily forwarded by the driver to the trucking company office, for example orally over a phone, for the immediate analysis of both the efficiency of the vehicle and the driver.

OBJECTS, FEATURES, AND ADVANTAGES OF THE INVENTION

It is an object of the invention to provide a vehicle performance monitoring system which determines real-time information related to how efficiently a driver operates a vehicle during a trip.

It is another object of the invention to provide a vehicle performance monitoring system which helps the driver to avoid operating a vehicle inefficiently.

It is still another object of the invention to provide a method of monitoring from a central location, the efficiency of a plurality of drivers operating vehicles at remote locations.

It is a feature of the invention to record the total time at which a vehicle is operated at a manifold pressure, vehicle speed, or engine operating speed, respectively, which exceeds a corresponding predetermined threshold value.

It is another feature of the invention to record the total engine time and total engine idle time during a trip.

It is still another feature of the invention to provide the driver with the total time at which he has operated the vehicle at a manifold pressure, vehicle speed, or engine operating speed, respectively, which exceeds a corresponding threshold value while the driver is operating the vehicle.

SUMMARY OF THE INVENTION

A system which monitors the operating performance of a vehicle receives electrical signals related to the vehicle engine manifold pressure, vehicle speed, and vehicle engine operating speed from a manifold pressure transducer installed in the intake manifold of the engine, the speedometer, and the tachometer, respectively. The received signals are compared to respective preset threshold values and, when a received signal exceeds its respective threshold value, a timing meter begins to record the total time at which that threshold value is exceeded. The vehicle performance monitoring system is also provided with additional timing meters for recording the total time the engine is operating and the total time the engine is idling. The total engine operating time is determined from the total time during which an engine operating speed signal is received by the vehicle performance monitor module and the total engine idle time is determined from the total time during which an engine operating speed signal is received but a vehicle speed signal is not received.

BRIEF DESCRIPTION OF THE DRAWINGS

The present invention may be better understood, and its numerous objects, features and advantages will become apparent to those skilled in the art by reference to the accompanying drawings in which.

DESCRIPTION OF THE INVENTION

Figure 1:
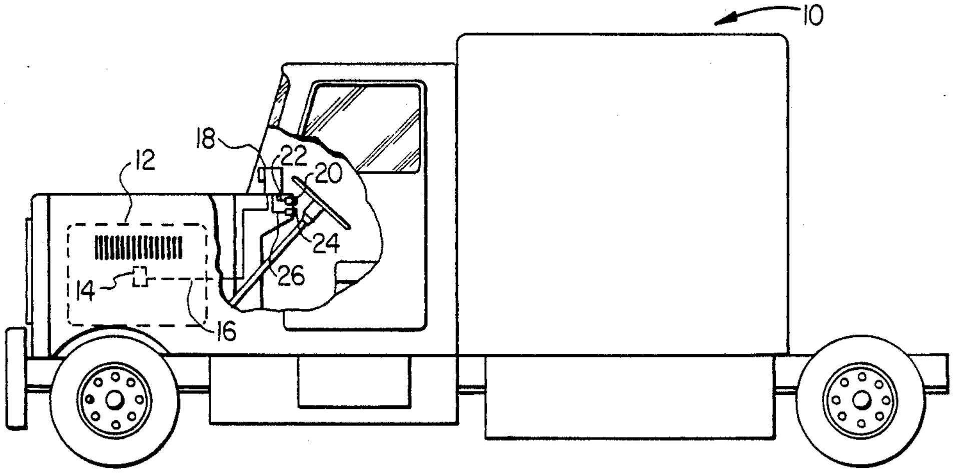
FIG. 1 is a partial cross-sectional view of a truck having a vehicle performance monitoring system which is constructed in accordance with the teachings of the present invention.

Referring first to FIG. 1, there is illustrated a partial cross-sectional view of a vehicle having a vehicle performance monitoring system constructed in accordance with the teachings of the present invention for monitoring the operating characteristics of the vehicle. Vehicle 10 is a conventional motorized vehicle powered by an internal combustion engine 12. A manifold pressure transducer 14, also of conventional design, is positioned in the intake manifold of engine 12 to measure pressure or vacuum, depending on the configuration of the vehicle. Electrical signals indicative of variations in the intake manifold pressure are transmitted via electrical line 16 to a dash-mounted vehicle performance module 18. Vehicle 10 is also provided with a vehicle speed sensing/display means 20 for measuring and displaying the speed of vehicle 10 and an engine speed sensing/display means 24 for measuring and displaying the operating speed of the engine. Vehicle speed sensing/display means 20 and engine speed sensing/display means 24 are electrically connected to corresponding electrical lines 22 and 26 for the transmission of electrical signals indicative of the vehicle speed and engine speed, respectively, to vehicle performance module 18.

Figure 2:
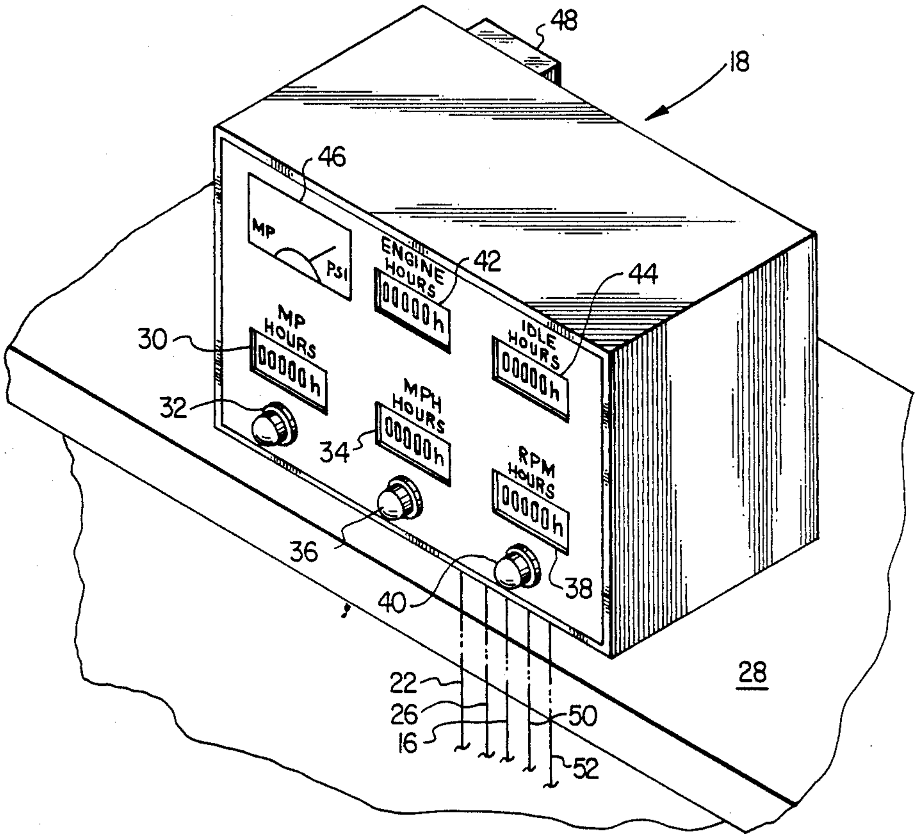
FIG. 2 illustrates a front view of the dash-mounted display of the vehicle performance monitoring system of FIG. 1.

Turning next to FIG. 2, a perspective view of vehicle performance module 18 may now be seen. Vehicle performance module 18 is securely mounted to dash 28 by mounting means not shown in FIG. 2, and positioned on dash 28 such that displays disposed on the face of vehicle performance module 18 may be easily read by the driver of vehicle 10 during vehicle operation. Vehicle performance module 18 is powered by a 12 volt signal supplied by lines 50 and 52 and includes a first timing meter 30 for displaying the total time during which the manifold pressure exceeds a preset manifold pressure threshold value, a second timing meter 34 for displaying the total time during which the vehicle speed exceeds a preset vehicle speed threshold value, and a third timing meter 38 for displaying the total time during which the engine operating speed exceeds a preset engine operating speed threshold value. Any conventional timing meter such as a Model 1188 timing meter by KEP of Atlantic Highlands, NJ would be satisfactory for use. First timing meter 30, second timing meter 34, and third timing meter 38 are each associated with a corresponding warning light 32, 36, and 40, respectively, for providing means for indicating vehicle operation conditions which exceed a threshold value. More specifically, when the manifold pressure of the vehicle exceeds the preset manifold pressure threshold value, warning light 32 will light. Similarly, when the vehicle speed exceeds the vehicle speed threshold value, warning light 36 will light and when the engine operating speed exceeds the engine operating speed threshold value, warning light 40 will light.

To provide the driver with additional information related to the performance of vehicle 10, vehicle performance module is further provided with a fourth timing meter 42 for displaying the total time during which engine 12 is operating, a fifth timing meter 44 for displaying the total time during which engine 12 is idling, and an illuminated needle meter 46 for displaying the intake manifold pressure of engine 12. Audible warning means 48 such as a buzzer is also provided to sound an audible warning whenever the first of either the manifold pressure threshold value, vehicle speed threshold value, or engine operating speed threshold value are exceeded.

Figure 3:
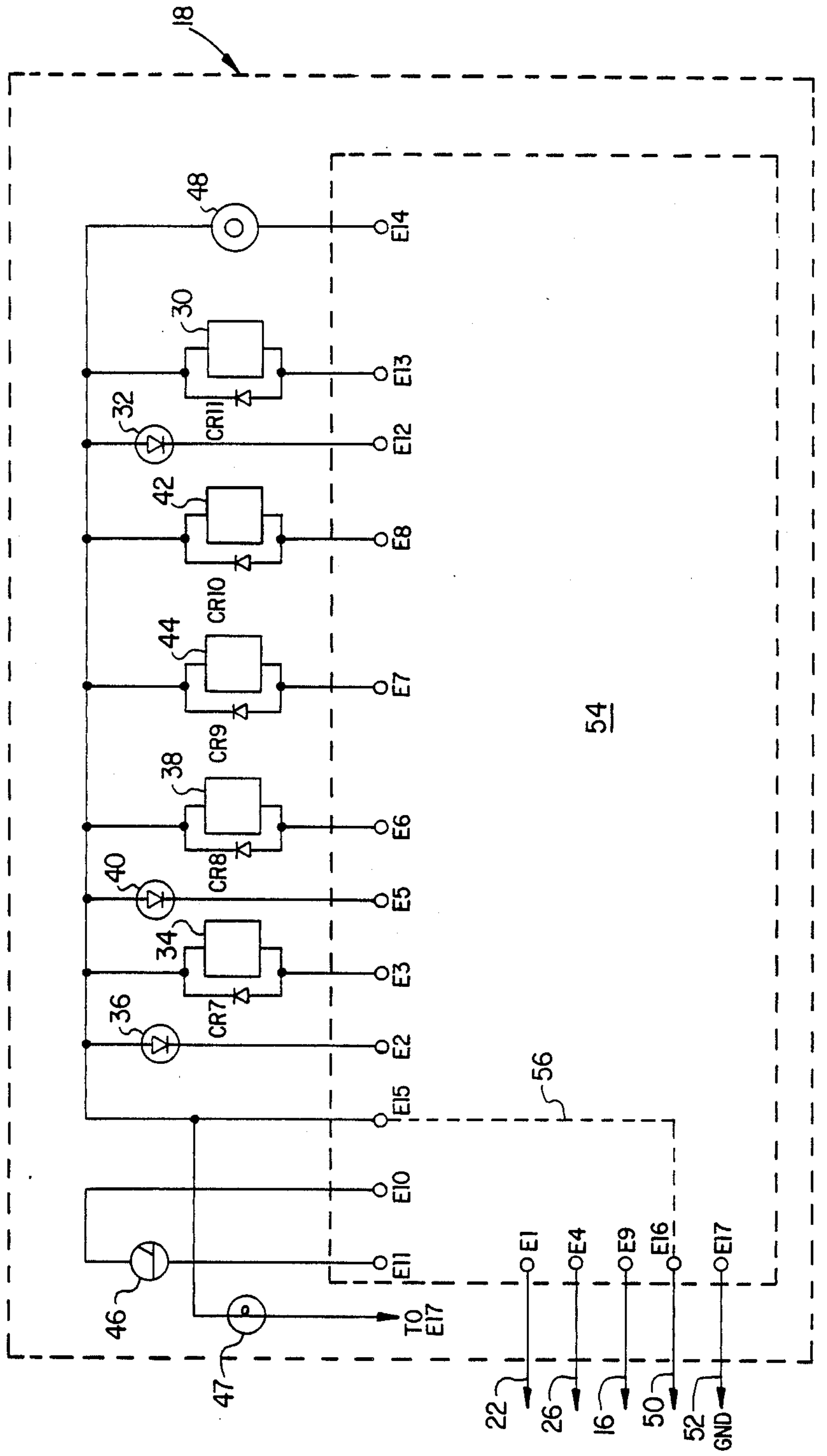
FIG. 3 is a wiring diagram of the vehicle monitoring system of FIG. 1.

Turning next to FIG. 3, a wiring diagram illustrating the components and electrical connections of vehicle performance module 18 may now be seen. In conjunction with the electrical components described with respect to FIG. 3, vehicle performance module 18 also includes printed circuit board 54, the exact configuration of which will be described in greater detail with respect to FIGS. 4*a*–*d*. Printed circuit board (PCB) 54 has 17 external terminals labelled E1 through E17, respectively. Lines 16, 22, 26, 50 and 52 provide the external connections for vehicle performance module 18. Line 16 supplies an electrical signal indicative of the intake manifold pressure and is connected to terminal E9 of PCB 54. Line 22 supplies an electrical signal indicative of the speed of vehicle 10 and is connected to terminal E9 of PCB 54. This signal can be taken from the input to the display of a conventional electronic vehicle speedometer. Line 26 supplies an electrical signal indicative of the engine operating speed of vehicle 10 and is connected to terminal E4 of PCB 54. This signal can be taken from the input to the display of a conventional electronic vehicle tachometer. A 12 volt d.c. source is connected with vehicle performance module 18 by line 50 at terminal E16 and a path from vehicle performance module 18 to ground is provided from the connection of terminal E17 and line 52.

Jumper wire 56 is connected between terminals E16 and E15 to provide power to numerous electrical components included as part of vehicle performance module 18. Excess manifold pressure warning light 32, excess vehicle speed warning light 36 and excess engine operation speed warning light 40, each of which, for example, may be a light emitting diode (LED), are connected between terminal E15 and terminals E12, E2, and E5, respectively. First timing meter 30, second timing meter 34, third timing meter 38, fourth timing meter 42 and fifth timing meter 44, each of which provide a display of the total time for which a different vehicle operation parameter exceeds a corresponding threshold value, are connected between terminal E15 and terminals E13, E3, E6, E8, and E7, respectively. A single transient voltage suppressing diode (CR7-11) is connected in parallel across each timing meter. Needle meter 46, which provides the actual manifold pressure reading, is connected between terminals E10 and E11 and illumination means 47 for illuminating needle meter 46 is connected between terminal E15 (12 volts) and E17(ground) and audible warring means 48 is connected between terminals E15 and E14.

Referring now to FIGS. 3 and 4*a*–*d*, the operation of vehicle performance module 18 and, in particular, the operation of timing meters 30, 34, and 38 for determining the total time that the engine manifold pressure, vehicle speed, and engine speed exceed respective threshold values, are now described in detail.

Vehicle performance module 18 is powered by a 12 volt d.c. source connected to terminal E16. Terminal E15 is connected to terminal E16 through diode CR5 and jumper 56, thereby providing 12 volts at terminal E15. Terminal E15 is also connected to a voltage regulator U9 which produces a 5 volt output for power to the electrical components of PCB 54.

Figure 4A:
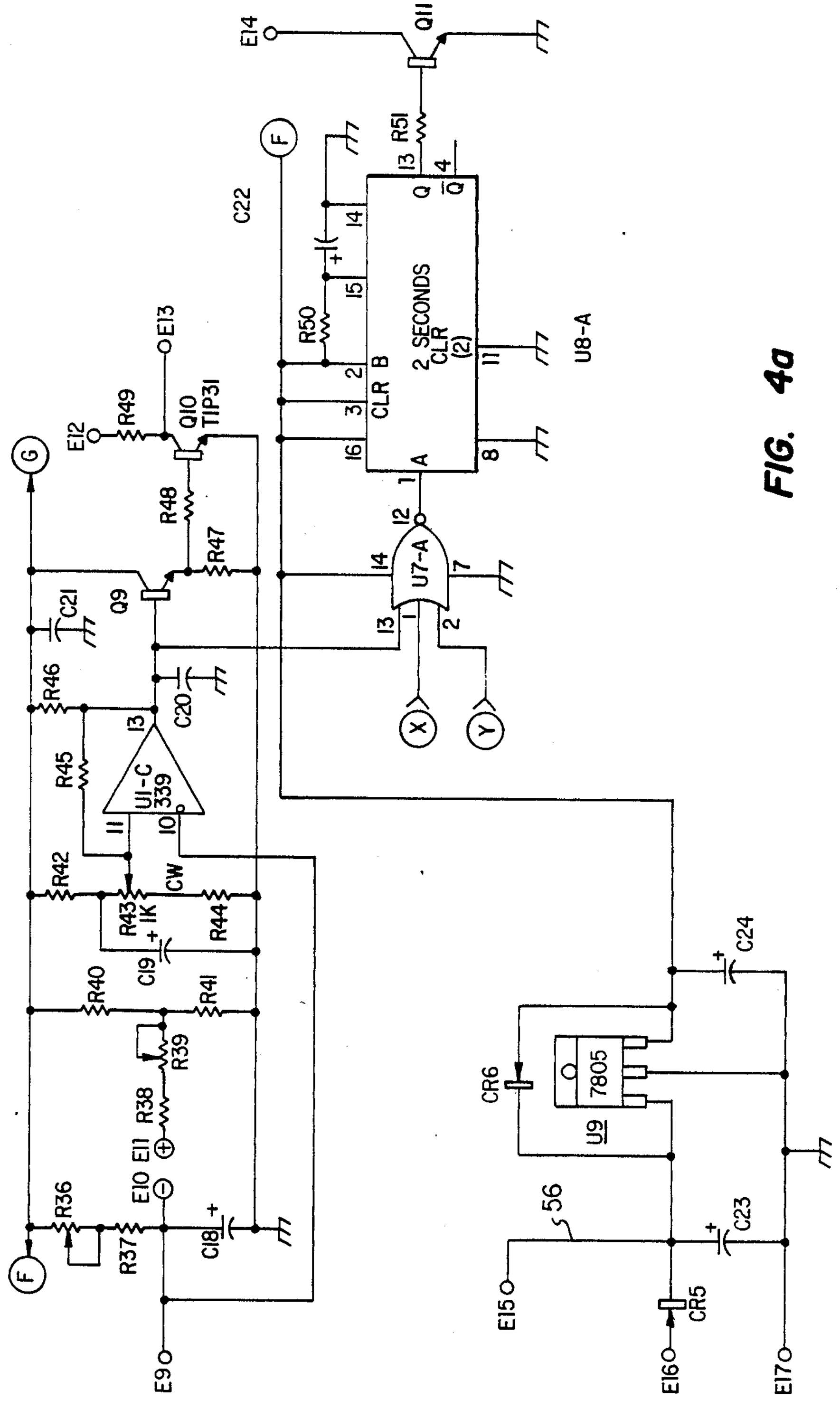
FIGS. 4*a–d* is a detailed schematic diagram of the printed circuit board of FIG. 3.

Having described the means for supplying both 5 and 12 volt lines to vehicle performance module 18, the apparatus shown in FIG. 4*a* for determining the total time that the engine manifold pressure exceeds a manifold pressure threshold value may now be discussed in detail. Manifold pressure transducer 14, for example, a fuel pressure transducer positioned in the intake manifold of the engine, is a variable resistance transducer connected between terminal E9 and ground. Needle meter 46 is connected between terminals E10 and E11 to provide the actual values of manifold pressure supplied by transducer 14 during the operation of vehicle 10. The output from terminal E9 is connected to the inverted input of comparator U1-C. The second input to comparator U1-C is connected to the output of a voltage divider comprised of resistors R42, R43 (which is a variable potentiometer), and R44. Potentiometer R43 is set at a resistance value which correlates with a preselected manifold pressure value at which operation of vehicle 10 is to be permitted. The manifold pressure threshold value would vary depending on any number of considerations such as the type of vehicle being monitored and the extent to which fuel efficiency is to be maximized. After potentiometer R43 has been set at the desired manifold pressure threshold value, if the manifold pressure detected by transducer 14 exceeds the selected threshold value, the output terminal of comparator U1-C will go high, turning on transistors Q9 and Q10. Terminals E12 and E13 are powered, terminal E12 activating warning light 32 to provide a visual indication to the driver that the manifold pressure has exceeded the maximum manifold pressure permitted and that the operator should take corrective action to reduce the manifold pressure to prevent the accumulation of additional time on timing meter 30 which displays the total time at which vehicle 10 is operated at an excessive manifold pressure. Simultaneously with the activation of warning light 32, timing meter 30 is activated by the powering up of terminal E13. As long as the manifold pressure exceeds the manifold pressure threshold value, terminal E13 will be powered and timing meter 30 will continue to record the total amount of time at which vehicle 10 is operated at an excessive manifold pressure. Once the driver has taken corrective action to reduce manifold pressure below the threshold value, the output of comparator U1-C will go low, turning off transistors Q9 and Q10, thereby turning off timing meter 30 and warning light 32.

Figures 4B, 4C, 4D:
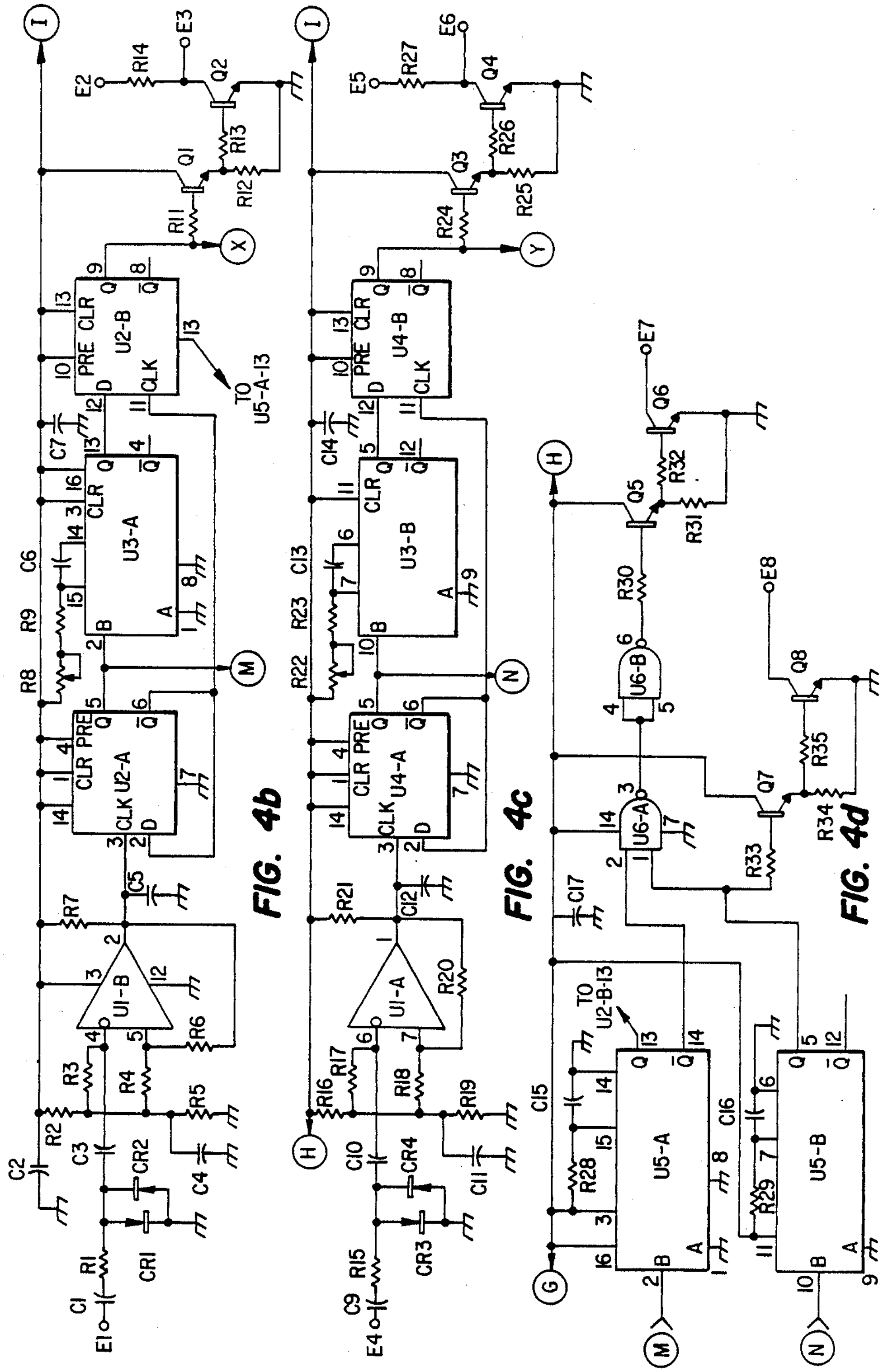

Turning next to FIG. 4*b*, the operation of timing meter 34 for determining the total time at which vehicle 10 is operated at an excessive vehicle speed is now discussed. Speed sensing means 20 supplies an AC signal indicative of the vehicle operating speed to terminal E1 via line 22. The AC signal is applied to a voltage limiter comprised of resistor R1 and a pair of diodes CR1 and CR2 to limit AC signal to a maximum of 1 volt. The voltage limited AC signal is then converted into a square wave having the same frequency by tying the voltage limited AC signal to the inverted input of a comparator U1-B which is supplied by biasing network R2-R3-R4-R5 with 2.5 volts DC at both inputs. The square wave output from comparator U1-B is supplied to the clock input of D flip flop U2-A. Flip flop U2-A produces a square wave output having a frequency one-half of the frequency of the square wave output of comparator U1-B and a pulse width equal to the period of the waveform outputted by U1-B. The Q output of U2-A triggers a one-shot multivibrator U3-A adjusted to have a period equal to the period of the preselected vehicle speed threshold value. For example, it is desireable to have an vehicle speed threshold value which may be adjusted between 50 and 100 mph. The particular vehicle speed threshold value selected would vary depending on such factors as engine horsepower, local speed limits and road conditions. A vehicle speed threshold value which is adjustable between 50 and 100 mph would correspond to a one-shot multivibrator period having a range of 1.5 to 3.0 milliseconds.

When vehicle 10 is being operated at a speed lower than the selected vehicle speed threshold value, the period of the Q output of flip flop U2-A would be longer than the period of the output of one shot multivibrator U3-A. The Q output of one shot multivibrator U3-A is supplied to the D input of flip flop U2-B and the inverted Q output of flip flop U2-A is supplied to the clock input of U2-B. As a result, the Q output of flip flop U2-B will go high only when the signal from the inverted Q output from U2-A has an pulse width narrower than the pulse width outputted from the Q output of U3-A. The Q output of flip flop U2-B will only go high, however, when the vehicle speed exceeds the vehicle speed threshold value. When the Q output of flip flop U2-B goes high, transistors Q1 and Q2 are turned on, thereby providing power at terminals E2 and E3 essentially simultaneously. Terminal E2 activates warning light 36 to provide a visual indication to the driver that the vehicle speed has exceeded the maximum speed permitted and that the operator should take corrective action to reduce vehicle speed to prevent the accumulation of additional time on timing meter 34 which displays the total time at which vehicle 10 is operated at excessive speeds. Simultaneous with the activation of warning light 36, timing meter 34 is activated by the powering up of terminal E3. For as long as the vehicle speed exceeds the vehicle speed threshold value, terminal E3 will be powered and timing meter 34 will continue to add time to the display of the total amount of time at which vehicle 10 has been operated at an excessive vehicle speed. Once the driver has taken corrective action to reduce vehicle speed below the threshold value, the pulse width of the square wave outputted by comparator U1-B and flip flop U2-A will be increased, the output of flip flop U2-B will go low, transistors Q1 and Q2 will be turned off, no additional violation time will be accumulated by timing meter 34 and warning light 36 will be extinguished.

Turning next to FIG. 4*c*, the operation of timing meter 38 for determining the total time at which vehicle 10 is operated at an excessive engine operating speed is now determined. As the circuitry used to operate timing meter 38 to accumulate the total time that the engine operating speed exceeds the engine operating speed threshold value is identical to the circuity utilized to operate timing meter 34 for accumulating the total time that the vehicle speed exceeds the vehicle speed threshold value, the operation of the circuit illustrated in FIG. 4*c* need not be explained in great detail.

Similar to the operation of the circuitry illustrated in FIG. 4*b*, the Q output of U4-A is a square wave having a frequency and pulse width related to the frequency and pulse width of the AC signal related to the engine operating speed which is received at terminal E-4 from tachometer sensing means 24. One-shot multivibrator U3-B is adjusted to have a period equal to the period of the preselected vehicle engine operating speed threshold value. For example, it is desireable to have an vehicle speed threshold value which may be adjusted between 1,000 and 2,500 rpm. The particular engine speed threshold value selected would vary from vehicle to vehicle depending primarily on the type and size of the engine. This rpm range would correspond to a one-shot multivibrator adjustable between 0.5 and 0.2 milliseconds.

When engine 12 of vehicle 10 is being operated at an engine speed lower than the selected engine speed threshold value, the Q output of flip flop U4-B would be low and neither timing meter 38 nor warning light 40 would indicate an operating violation. When the operating speed of engine 12 exceeds the engine speed threshold value, the Q output of flip flop U4-B is driven high. Transistors Q3 and Q4 are turned on and terminals E5 and E6 powered. Terminal E5 activates warning light 40 to provide a visual indication to the driver that the engine operating speed has exceeded the maximum operating speed permitted and that the operator should take corrective action to reduce engine operating speed to prevent the accumulation of additional time on timing meter 38 which displays the total time at which vehicle 10 is operated at an excessive engine operating speed. Simultaneous with the activation of warning light 40, timing meter 38 is activated by the powering up of terminal E6. For as long as the engine operating speed exceeds the engine operating speed threshold value, terminal E6 will be powered and timing meter 38 will continue to add time to the display of the total amount of time at which vehicle 10 has been operated at an excessive engine speed. Once the driver has taken corrective action to reduce engine speed below the threshold value, the pulse width of the Q(bar) square wave outputted by flip flop U4-A will be increased, the output of flip flop U4-B will go low, transistors Q3 and Q4 will be turned off, no additional violation time will be accumulated by timing meter 38 and warning light 40 will be extinguished.

Turning now to FIG. **4*d*, the operation of timing meter 42 which determines the total operating time of the engine and timing meter 44 for determining the total idle time of the engine are now described. The Q outputs from flip flops U2-A and U4-A, which are square waves with a pulse width equal to the period and a frequency half the frequency of the input signals from vehicle speed sensing means 20 and engine operating speed sensing means 24, respectively, are inputted into a corresponding retriggerable one-shot multivibrator U5-A, U5-B. The Q(bar) output of multivibrator U5-A, which is connected to a first input of NAND gate U6-A, will stay low if there is a signal from speed sensing means 20 indicating that vehicle 10 is moving. The Q output of U5-B, the output of which will be high if there is a signal from engine speed sensing means 24 indicating that engine 12** is operating.

When both vehicle speed and engine operating speed are detected, the output of NAND gate U6-A is high. As the output of NAND gate U6-A is supplied as both inputs to NAND gate U6-B, the output of U6-B will be low and transistor Q5 will remain off when both vehicle speed and engine operating speed are detected. As the Q output of U5-B is high, however, transistors Q7 and Q8 will be turned on and timing meter 42 will accumulate additional hours of engine time.

When vehicle 10 is idling, an engine operating speed signal will be received by multivibrator U5-B but no vehicle speed signal will be received by multivibrator U5-A. Accordingly, the Q(bar) output from U5-A will be high and the Q output from U5-B will remain high. As the two inputs to NAND gate U6-A will both be high, the output of U6-A will go low. Consequently NAND gate U6-B will go high, transistors Q5 and Q6 will be powered and timing meter 44 will be activated to add to the total hours of engine idle time. As the Q output of U5-B remains high, timing meter 42, will continue to accumulate total engine time while the engine is idling. When engine 12 is off, no engine operating speed signal is received by U5-B. The Q output of U5-B goes low. The output of NAND gate U5-A goes high, the output of NAND gate U6-B goes low and transistors Q5 and Q6 are turned off, stopping the accumulation of idle time by timing meter 44. As the Q output of U5-B is low, transistors Q7 and Q8 are turned off, stopping the accumulation of engine time by timing meter 42.

It is also contemplated that an audible alarm be provided to alert the driver at the time an operating threshold is exceeded. To provide for an audible alarm, the Q output of U2-B (which goes high when the vehicle speed threshold is exceeded), the Q output of U4-B (which goes high when the engine operating speed is exceeded) and the output of comparator U1-C (which goes high when the manifold pressure threshold is exceeded) are provided as the inputs to NOR gate U7-A. When any of the inputs to NOR gate U7-A go high, the output of U7-A will go low. In turn, one-shot multivibrator U8-A will be triggered to provide a high output, turning on transistor Q11, powering terminal E14 and activating audible alarm 48. As U8-A is selected such that the Q output of U8-A will remain high for only 1 second, the audible alarm will quickly turn off.

The operation of vehicle performance module 18 having been discussed in detail, the method of monitoring from a central location, the efficiency of a plurality of drivers operating vehicles at remote locations will now be described. As previously described, vehicle performance module 18 provides detailed vehicle performance information to the driver. The total engine operating time, the total idle time, and the total time that the vehicle is operated at excessive manifold pressure, speed, and engine operating speed, respectively, are prominently displayed by vehicle performance module 18. While such information will aid the driver in being aware of how efficiently the vehicle is being operated, it is further contemplated by the invention that this information is to be provided to a dispatcher at a central location for detailed processing. For example, the driver can transmit the vehicle performance module 18 data, along with the vehicle odometer reading, to the dispatcher over the phone during a daily check-in. The dispatcher inputs the received data into an existing database compiled in a digital computer of conventional design for immediate processing. The database processes the received information and outputs an analysis of the driver's performance which includes the percentage of engine operating time which the vehicle is idling as well as the percentage of engine operating time at which the vehicle is operated at a manifold pressure, speed, and engine operating speed exceeding the respective threshold values (the "percent violations"). The database also compares the driver's percent violations with predetermined target percent violations.

The dispatcher may then inform the driver over the phone whether or not the driver is operating within the target percent violations, and, if not, how much the driver is operating over target. The dispatcher may repeat this procedure with a plurality of drivers operating vehicles at different remote locations. It is further contemplated that the database compile all data received by truck and by driver so that both truck and driver performance may be evaluated.

Thus, there has been described and illustrated herein, a system for monitoring the performance of a vehicle which provides the driver with information such as the total time at which the engine manifold pressure, vehicle speed, and engine operating speed exceed corresponding threshold values related to how efficient the vehicle is operating, thereby enabling the driver to modify the operation of the vehicle to improve operating efficiency of the vehicle. However, those skilled in the art will recognize that many modifications and variations besides those specifically mentioned may be made in the techniques described herein without departing substantially form the concept of the present invention. Accordingly, it should be clearly understood that the form of the invention described herein is exemplary only and is not intended as a limitation on the scope of the invention.

What is claimed is:

1. A performance monitoring system for an engine-driven vehicle comprising:
means for determining manifold pressure of said engine;
means for comparing manifold pressure of said engine to a manifold pressure threshold value;
means for determining the total time during which the manifold pressure of said engine exceeds said manifold pressure threshold value; and
means for determining the total time during which said engine is operating.

2. The performance monitoring system according to claim 1 further comprising means for displaying the total time during which the manifold pressure of said engine exceeds said manifold pressure threshold value.

3. The performance monitoring system according to claim 1 further comprising means for providing an audible warning when the manifold pressure of said engine exceeds said manifold pressure threshold value.

4. A performance monitoring system for an engine-driven vehicle comprising:
means for determining manifold pressure of said engine;
means for comparing manifold pressure of said engine to a manifold pressure threshold value;
means for determining the total time during which the manifold pressure of said engine exceeds said manifold pressure threshold value; and
means for displaying the manifold pressure of said engine.

5. A performance monitoring system for an engine-driven vehicle comprising:
means for determining manifold pressure of said engine;
means for comparing manifold pressure of said engine to a manifold pressure threshold value;
means for determining the total time during which the manifold pressure of said engine exceeds said manifold pressure threshold value;
means for determining the operating speed of said vehicle;
means for comparing the operating speed of said vehicle to a vehicle operating speed threshold value; and
means for determining the total time during which the operating speed of said vehicle exceeds said vehicle operating speed threshold value.

6. The performance monitoring system according to claim 5 further comprising means for displaying the total time during which the operating speed of said vehicle exceeds said operating speed threshold value.

7. A performance monitoring system for an engine-driven vehicle comprising:
means for determining manifold pressure of said engine;
means for comparing manifold pressure of said engine to a manifold pressure threshold value;
means for determining the total time during which the manifold pressure of said engine exceeds the manifold pressure threshold value;
means for determining operating speed of said engine;
means for comparing operating speed of said engine to an engine operating speed threshold value; and
means for determining the total time during which the operating speed of said engine exceeds said engine operating speed threshold value.

8. The performance monitoring system according to claim 7 further comprising means for displaying the total time during which the operating speed of said engine exceeds said engine operating speed threshold value.

9. A performance monitoring system for an engine-driven vehicle comprising:
means for determining manifold pressure of said engine;
means for comparing manifold pressure of said engine to a manifold pressure threshold value;
means for determining the total time during which the manifold pressure of said engine exceeds the manifold pressure threshold value;
means for detecting vehicle speed;
means for detecting engine operating speed; and
means responsive to said means for detecting vehicle speed and said means for detecting operating speed, for determining the total time during which said vehicle is idling.

10. The performance monitoring system according to claim 9 further comprising means for displaying the total time during which said vehicle is idling.

11. The performance monitoring system according to claim 9 further comprising means for determining the total time during which said engine is operating.

12. A method of evaluating the operation of a vehicle over a period of time comprising the steps of:
setting a manifold pressure threshold value based on the operating characteristics of said vehicle;
measuring the manifold pressure of said vehicle during said period of time;
determining, for said period of time, the total time that the manifold pressure of said vehicle exceeds said manifold pressure threshold value; and
determining, for said period of time, the total time that said engine is operating.

13. A method for evaluating the operation of a vehicle over a period of time comprising the steps of:
setting a manifold pressure threshold value based on the operating characteristics of said vehicle;
measuring the manifold pressure of said vehicle during said period of time;
determining, for said period of time, the total time that the manifold pressure of said vehicle exceeds the manifold pressure threshold value;
setting an engine operating speed threshold value based on the operating characteristics of said vehicle;

measuring the engine operating speed of said vehicle during said period of time; and determining, for said period of time, the total time that the engine operating speed exceeds said engine operating speed threshold value.

14. A method for evaluating the operation of a vehicle over a period of time comprising the steps of:

setting a manifold pressure threshold value based on the operating characteristics of said vehicle;

measuring the manifold pressure of said vehicle during said period of time;

determining, for said period of time, the total time that the manifold pressure of said vehicle exceeds the manifold pressure threshold value;

setting a vehicle operating speed threshold value;

measuring the vehicle operating speed of said vehicle during said period of time; and determining, for said period of time, the total time that the vehicle operating speed exceeds said vehicle operating speed threshold value.

15. A method for evaluating the operation of a vehicle over a period of time comprising the steps of:

setting a manifold pressure threshold value based on the operating characteristics of said vehicle;

measuring the manifold pressure of said vehicle during said period of time;

determining, for said period of time, the total time that the manifold pressure of said vehicle exceeds the manifold pressure threshold value;

determining the total time said engine is operating; and determining, for the total time said engine is operating, the amount of time said engine is idling.

16. Apparatus for assisting a driver in the operation of an engine-drive vehicle, comprising:

a manifold pressure transducer positioned in the intake manifold of said engine, said manifold pressure transducer measuring the manifold pressure of said vehicle during the operation of said vehicle;

means for continuously transmitting an electrical signal corresponding to said measured manifold pressure;

a comparator circuit for receiving said continuously transmitted electrical signal, said comparator circuit continuously comparing during the operation of said vehicle, the manifold pressure measured by said transducer means to a manifold pressure threshold value;

first timing means for accumulating the total time said manifold pressure measured by said transducer has exceeded said manifold pressure threshold value during the operation of said vehicle; and second timing means for accumulating the total time during which the engine is operating.

17. Apparatus according to claim 16 further comprising a warning light visible to said driver, said warning light being illuminated during the accumulation of time by said timing means.

18. Apparatus according to claim 17 further comprising audible warning means, said audible warning means issuing an audible warning when said timing means begins the accumulation of time.

19. Apparatus for assisting a driver in the operation of an engine-driven vehicle, comprising:

a manifold pressure transducer positioned in the intake manifold of said engine, said manifold pressure transducer measuring the manifold pressure of said vehicle during the operation of said vehicle;

means for continuously comparing during the operation of said vehicle, the manifold pressure measured by said transducer means to a manifold pressure threshold value;

timing means for accumulating in a display visible to said driver, the total time said manifold pressure measured by said transducer has exceeded said manifold pressure threshold value during the operation of said vehicle; and means for displaying the manifold pressure of said vehicle measured by said transducer.

20. A method for evaluating at a central location, the performance of a driver operating a vehicle at a remote location comprising the steps of:

setting a manifold pressure threshold value;

measuring the manifold pressure of said vehicle during operation;

determining a first total time during which said vehicle is operating;

determining a second total time during the operation of said vehicle that the manifold pressure of said vehicle exceeds said manifold pressure threshold value;

transmitting said first and second determined total times to said central location for processing;

determining at said central location, a percent violation based upon said first determined total time and said second determined total time; and transmitting said percent violation to said driver at said remote location.

21. The method according to claim 20 further comprising the steps of:

determining a third total time during the operation of said vehicle that the engine of said vehicle idles;

transmitting said third determined total time to said central location for processing; and wherein said percent violation is determined based upon said first, second and third determined total times.

* * * * *